(12) United States Patent
Brittingham et al.

(10) Patent No.: US 8,371,818 B2
(45) Date of Patent: Feb. 12, 2013

(54) AIRFOIL SHAPE FOR A TURBINE BUCKET

(75) Inventors: Robert A. Brittingham, Piedmont, SC (US); Bruce L. Smith, Greer, SC (US); Charles A. Malinowski, Mauldin, SC (US)

(73) Assignee: General Electric Company, Schenectady, NY (US)

( * ) Notice: Subject to any disclaimer, the term of this patent is extended or adjusted under 35 U.S.C. 154(b) by 1478 days.

(21) Appl. No.: 12/109,418

(22) Filed: Apr. 25, 2008

(65) Prior Publication Data

US 2009/0269204 A1 Oct. 29, 2009

(51) Int. Cl.
 *F01D 5/14* (2006.01)
(52) U.S. Cl. .................................... 416/223 A; 416/243
(58) Field of Classification Search .............. 416/223 A, 416/243
 See application file for complete search history.

(56) References Cited

U.S. PATENT DOCUMENTS 6,450,770 B1 * 9/2002 Wang et al. ............... 416/223 A

* cited by examiner

*Primary Examiner* — Edward Look
*Assistant Examiner* — Liam McDowell
(74) *Attorney, Agent, or Firm* — Mark E. Henderson; Ernst G. Cusick; Frank A. Landgraff

(57) ABSTRACT

A turbine bucket including an airfoil, the airfoil having a nominal profile substantially in accordance with Cartesian coordinate values of X, Y and Z set forth in Table 1 as contained herein wherein the Z values are non-dimensional values from approximately 0 to 1 convertible to Z distances in inches by multiplying the Z values by a height of the airfoil in inches, and wherein X and Y are distances in inches which, when connected by substantially smooth continuing arcs, define airfoil profile sections at each distance Z, the profile sections at the Z distances being joined substantially smoothly with one another to form a complete airfoil shape.

18 Claims, 3 Drawing Sheets

AIRFOIL SHAPE FOR A TURBINE BUCKET

BACKGROUND OF THE INVENTION

The present invention relates to turbine buckets. Turbine buckets, in general, are the rotating blades in a turbine engine that convert the flow of a working fluid through the turbine into mechanical energy. More particularly, but not by way of limitation, the present invention relates to an improved airfoil shape for turbine buckets. While the invention disclosed herein is described and intended for use in a gas turbine engine, as discussed in more detail below, a scaled design may be used effectively in a steam turbine or aircraft turbine engine.

The working fluid of a gas turbine engine generally comprises the resulting flow of hot gases from the combustion of a fuel. The flow of hot gases is directed through the turbine section of the engine, which generally includes multiple stages of turbine buckets. Each bucket includes a bucket airfoil or airfoil, which is the part of the bucket that interacts with the flow of working fluid. Because of the shape of the airfoil, the working fluid induces the stage of buckets to rotate about the rotor, thus converting the energy of the working fluid into mechanical energy.

As one of ordinary skill in the art will appreciate, the design and shape of the airfoils in the multiple stages may significantly impact the overall performance of the turbine. The airfoils for each of the stages have a unique set of design requirements, which must be met for turbine performance objectives, for example, overall engine efficiency, to be satisfied. In some cases, minor variances in airfoil design and shape may have significant effects on engine operating efficiency or the loading characteristics of the turbine buckets during operation. Of course, as energy costs rise, as they inevitably seem to do, designing turbine engines that promote efficiency is a continuing and important objective. As a result, there is a continuing need for improved airfoil shapes that provide efficient turbine operation through the several stages of a turbine engine.

BRIEF DESCRIPTION OF THE INVENTION

The present application thus describes a turbine bucket that may include an airfoil, the airfoil having a nominal profile substantially in accordance with Cartesian coordinate values of X, Y and Z set forth in Table 1 wherein the Z values are non-dimensional values from approximately 0 to 1 convertible to Z distances in inches by multiplying the Z values by a height of the airfoil in inches, and wherein X and Y are distances in inches which, when connected by substantially smooth continuing arcs, define airfoil profile sections at each distance Z, the profile sections at the Z distances being joined substantially smoothly with one another to form a complete airfoil shape.

The present application further describes a turbine bucket that includes an airfoil having an uncoated nominal airfoil profile substantially in accordance with Cartesian coordinate values of X, Y and Z set forth in Table 1 wherein the Z values are non-dimensional values from approximately 0 to 1 convertible to Z distances in inches by multiplying the Z values by a height of the airfoil in inches, and wherein X and Y are distances in inches which, when connected by smooth continuing arcs, define airfoil profile sections at each Z distance, the profile sections at the Z distances being joined smoothly with one another to form a complete airfoil shape, the X, Y and Z distances being scalable as a function of the same constant or number to provide a scaled-up or scaled-down airfoil.

The present application further describes a turbine bucket that includes an airfoil having an airfoil shape, said airfoil having a nominal profile substantially in accordance with at least approximately 95% of the Cartesian coordinate values of X, Y and Z set forth in Table 1 wherein the Z values are non-dimensional values from approximately 0 to 1 convertible to Z distances in inches by multiplying the Z values by a height of the airfoil in inches, and wherein X and Y are distances in inches which, when connected by substantially smooth continuing arcs, define airfoil profile sections at each distance Z, the profile sections at the Z distances being joined substantially smoothly with one another to form a complete airfoil shape.

These and other features of the present application will become apparent upon review of the following detailed description of the preferred embodiments when taken in conjunction with the drawings and the appended claims.

BRIEF DESCRIPTION OF THE DRAWINGS

These and other objects and advantages of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
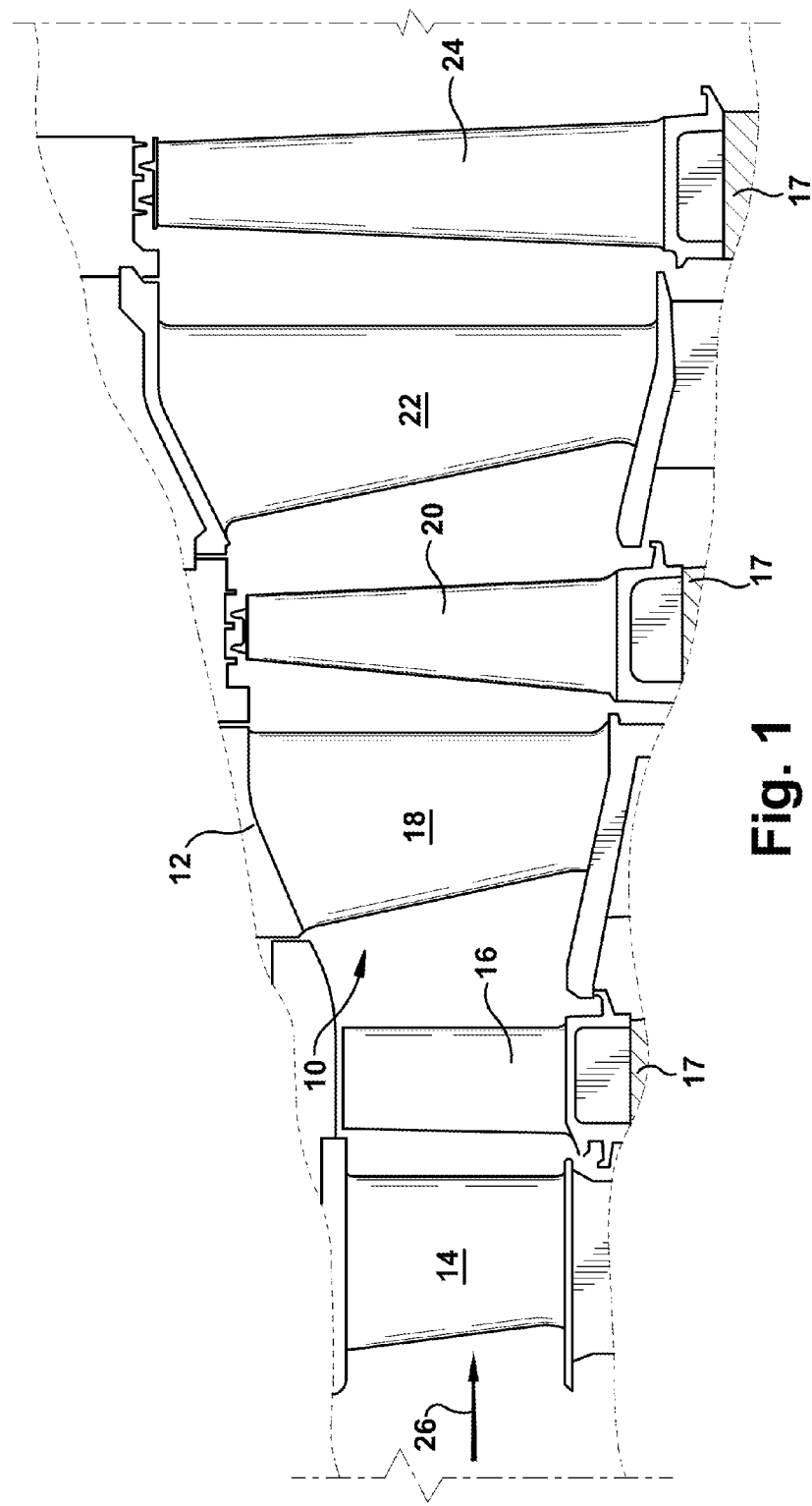
FIG. 1 is a schematic representation of a hot gas path through multiple stages of a gas turbine and illustrates an exemplary second stage bucket airfoil according to an embodiment of the present invention.

Referring now to the drawing figures, FIG. 1 illustrates a hot gas path, generally designated 10, of a gas turbine 12 that includes a plurality of turbine stages. Three stages are illustrated. A first stage may include a plurality of circumferentially spaced nozzles 14 and turbine blades or buckets 16. The first stage nozzles 14 generally are circumferentially spaced one from the other and fixed about the axis of the rotor (not shown). The first stage buckets 16 may be mounted on a turbine wheel 17 for rotation about the rotor when hot gases are expanded through the hot gas path 10. A second stage of the turbine 12 is also illustrated. The second stage similarly may include a plurality of circumferentially spaced nozzles 18 and a plurality of circumferentially spaced buckets 20 mounted on a turbine wheel 17. A third stage also is illustrated and includes a plurality of circumferentially spaced nozzles 22 and buckets 24 mounted on a turbine wheel 17. It will be appreciated that the nozzles and buckets lie in the hot gas path 10 of the turbine 12, the direction of flow of the hot gas through the hot gas path 10 being indicated by the arrow 26.

Figure 2:
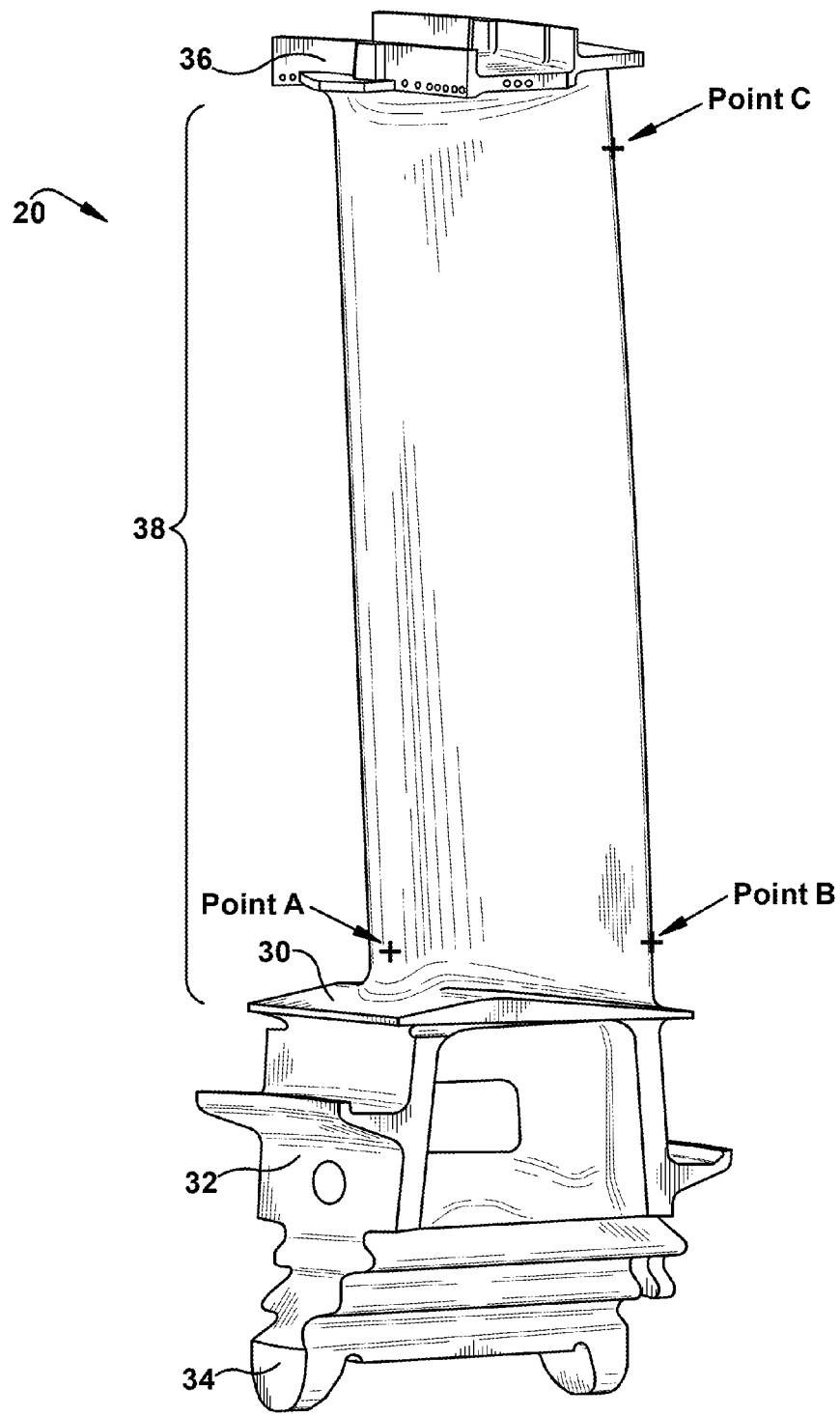
FIG. 2 is a perspective view of a turbine bucket according to an exemplary embodiment of the present invention with the bucket airfoil illustrated in conjunction with its platform and dovetail connection.
Figure 3:
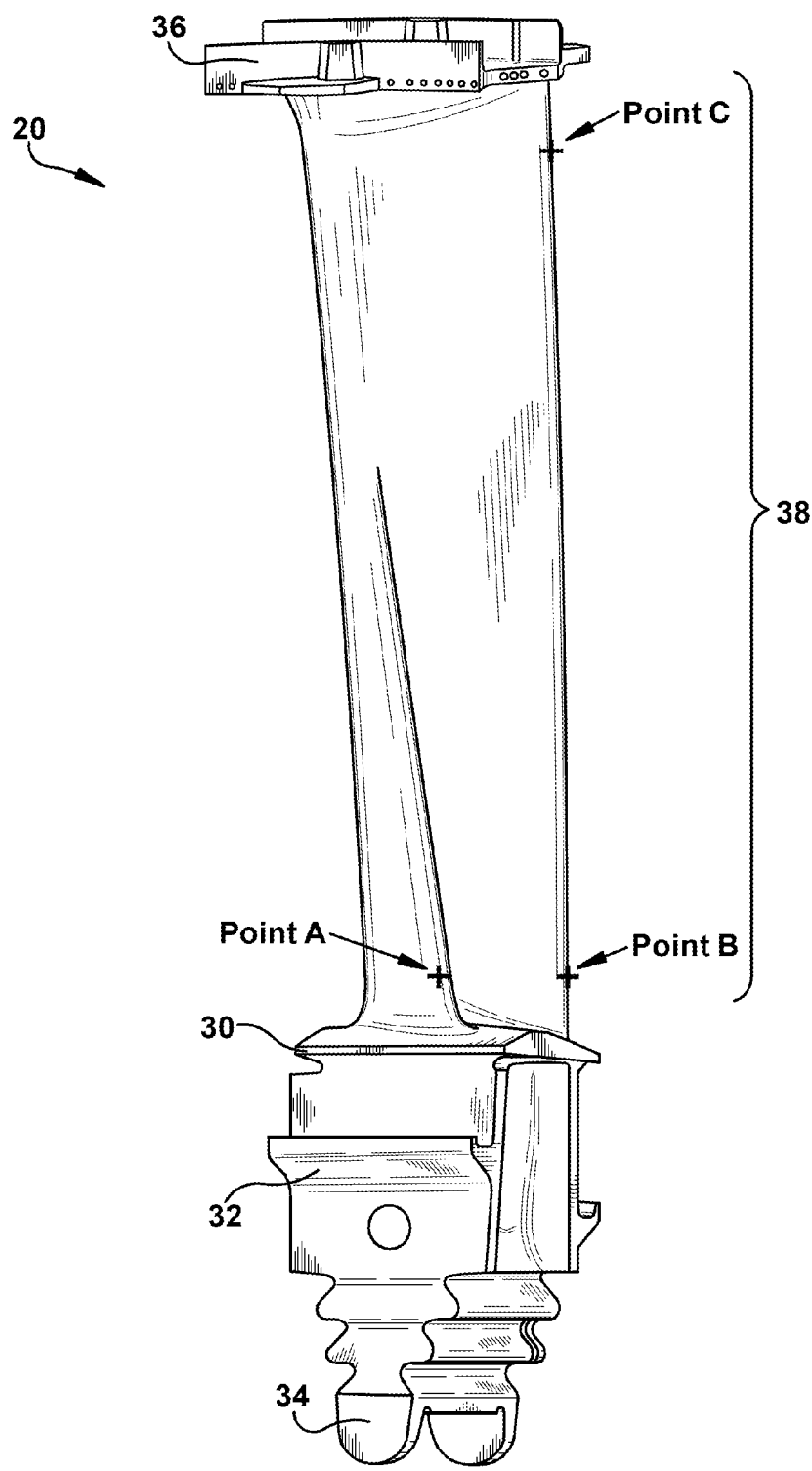
FIG. 3 is an alternative perspective view of the turbine bucket of FIG. 2.

As one of ordinary skill in the art will appreciate, a turbine bucket, as indicated on FIGS. 2 and 3, generally includes a platform 30, a shank 32, and a dovetail 34, which are used to connect the bucket to the turbine wheel 17. A tip shroud 36 may be provided at the tip of each of the buckets 20. Each of the buckets 20 also may include a bucket airfoil or airfoil 38 that generally resides along the length of the bucket 20 between the platform 30 and the tip shroud 36. Along the airfoil 38, the bucket 20 generally has a cross-sectional shape of an airfoil. Because of the airfoil shape, the flow of the hot gases induces the bucket stage to rotate about the rotor such that the energy of the expanding hot gases is converted into the mechanical energy of the rotating rotor.

An exemplary embodiment of an airfoil shape according to the present invention is illustrated in FIGS. 2 and 3. The exemplary embodiment of FIGS. 2 and 3, for example, may be used as a turbine bucket 20 in a gas turbine, though other uses, such as in a steam turbine or aircraft engine, are also possible. More specifically, though it is not so limited, the exemplary embodiment of FIGS. 2 and 3 may be used as a second stage bucket in a gas turbine engine. Further, though it is not so limited, the exemplary embodiment of FIGS. 2 and 3 may be used as a second stage bucket in a 7FA+e Gas Turbine Engine manufactured by The General Electric Company ("GE") of Schenectady, N.Y.

As described herein, to define the shape of the airfoil 38 of the exemplary embodiment of FIGS. 2 and 3, a unique set or loci of points in space may be delineated. As shown in Table 1, the loci that defines the shape of the airfoil 38 may include a set of approximately 1,200 points with X, Y and Z coordinates relative to the origin coordinate system established in FIGS. 2 and 3. More specifically, as one of ordinary skill in the art will appreciate, the coordinate system is set relative to the airfoil and is fully defined by points A, B and C. Points A and B are both located 39.600 inches above the cold rotor center line. Point A lies at the intersection of the airfoil mean camber line and the leading-edge airfoil surface. Point B lies at the intersection of the airfoil mean camber line and the trailing-edge airfoil surface. Point C is located 49.862 inches above the cold rotor center line and lies at the intersection of the airfoil mean camber line and the airfoil trailing-edge surface. The coordinate system origin is located at point A. Points A and B define the positive X-axis. Points A, B and C define the positive X-Z plane. The Y-axis is then defined using the right-hand rule methodology. Thus, as illustrated, in some embodiments, the height of the airfoil may be approximately 10 to 11 inches. In some embodiments, the overall height of the bucket may be 17 to 19 inches. As discussed below, other heights are possible.

The Cartesian coordinate system of X, Y and Z values given in Table 1 below defines the shape of the airfoil 38 according to an exemplary embodiment of the present application. More specifically, the shape of the airfoil 38 is defined by the cloud of points listed such that airfoil 38 could be constructed by defining approximately smooth sheet surfaces through the listed points. The coordinate values for the X, Y and Z coordinates are set forth in inches in Table 1, although other units of dimensions may be used if the values are appropriately converted.

As one of ordinary skill in the art will appreciate, the Table 1 values are generated and shown to 3 decimal places for determining the profile of airfoil 38. These points represent the nominal cold or room temperature shape of the airfoil 38. As the bucket heats up in operation, mechanical loading and temperature will cause a change in X, Y and Z coordinates. Accordingly, values for the airfoil shape given in Table 1 represent ambient, non-operating or non-hot conditions.

Further, there are typical manufacturing and coating tolerances that must be accounted for in the actual profile of the airfoil shape. It will therefore be appreciated that +/− typical manufacturing tolerances, i.e., +/− values, including any coating thickness, are additive to the X and Y values given in Table 1 below. Accordingly, a distance of +/−0.04 inches in a direction normal to any surface location along the airfoil 38 may define an airfoil profile in accordance with the exemplary embodiment of Table 1. Thus, a variation within the tolerance value between measured points on the actual airfoil surface at nominal cold or room temperature and the ideal position of these points as given in the table below at the same temperature may exist. The airfoil 38 design is robust to this range of variation without impairment of mechanical functions.

TABLE 1

| X | Y | Z | X | Y | Z | X | Y | Z |
|---|---|---|---|---|---|---|---|---|
| 0.966 | 1.480 | −0.001 | 2.047 | 0.714 | 0.000 | 3.525 | 0.027 | 0.000 |
| 1.062 | 1.484 | −0.001 | 0.845 | 0.695 | 0.000 | −0.019 | 0.011 | 0.000 |
| 1.158 | 1.480 | −0.001 | 2.886 | 0.689 | 0.000 | 0.073 | −0.009 | 0.000 |
| 0.871 | 1.468 | −0.001 | 2.138 | 0.682 | 0.000 | 3.607 | −0.023 | 0.000 |
| 1.254 | 1.470 | −0.001 | 0.006 | 0.651 | 0.000 | 3.607 | −0.023 | 0.000 |
| 0.777 | 1.448 | −0.001 | 0.767 | 0.639 | 0.000 | 3.698 | −0.022 | 0.000 |
| 1.348 | 1.454 | −0.001 | 2.228 | 0.649 | 0.000 | 0.916 | 1.511 | 0.090 |
| 1.442 | 1.433 | −0.001 | 2.966 | 0.636 | 0.000 | 1.009 | 1.515 | 0.090 |
| 0.686 | 1.418 | −0.001 | 2.317 | 0.614 | 0.000 | 1.103 | 1.511 | 0.090 |
| 1.535 | 1.408 | −0.001 | 0.694 | 0.577 | 0.000 | 0.822 | 1.500 | 0.090 |
| 0.598 | 1.379 | −0.001 | 2.406 | 0.577 | 0.000 | 1.197 | 1.501 | 0.090 |
| 1.626 | 1.378 | −0.001 | 3.045 | 0.581 | 0.000 | 0.730 | 1.480 | 0.090 |
| 1.716 | 1.345 | −0.001 | −0.026 | 0.561 | 0.000 | 1.290 | 1.486 | 0.090 |
| 0.515 | 1.332 | −0.001 | 2.495 | 0.540 | 0.000 | 1.381 | 1.465 | 0.090 |
| 1.805 | 1.309 | −0.001 | 3.124 | 0.527 | 0.000 | 0.641 | 1.452 | 0.090 |
| 0.437 | 1.276 | −0.001 | 0.625 | 0.510 | 0.000 | 1.472 | 1.440 | 0.090 |
| 1.893 | 1.271 | −0.001 | 2.583 | 0.502 | 0.000 | 0.554 | 1.415 | 0.090 |
| 1.980 | 1.230 | −0.001 | −0.054 | 0.469 | 0.000 | 1.561 | 1.411 | 0.090 |
| 0.364 | 1.213 | −0.001 | 2.671 | 0.463 | 0.000 | 0.473 | 1.368 | 0.090 |
| 2.066 | 1.187 | −0.001 | 3.203 | 0.472 | 0.000 | 1.650 | 1.378 | 0.090 |
| 0.297 | 1.145 | −0.001 | 0.560 | 0.439 | 0.000 | 1.737 | 1.342 | 0.090 |
| 2.151 | 1.142 | −0.001 | 2.758 | 0.424 | 0.000 | 0.396 | 1.314 | 0.090 |
| 2.235 | 1.095 | −0.001 | 3.281 | 0.416 | 0.000 | 1.822 | 1.304 | 0.090 |
| 0.236 | 1.071 | −0.001 | 2.845 | 0.383 | 0.000 | 0.325 | 1.253 | 0.090 |
| 2.318 | 1.048 | −0.001 | −0.075 | 0.375 | 0.000 | 1.907 | 1.263 | 0.090 |
| 0.180 | 0.993 | −0.001 | 0.496 | 0.367 | 0.000 | 1.991 | 1.220 | 0.090 |
| 2.401 | 0.999 | −0.001 | 3.359 | 0.360 | 0.000 | 0.259 | 1.185 | 0.090 |
| 2.483 | 0.949 | −0.001 | 2.932 | 0.342 | 0.000 | 2.073 | 1.175 | 0.090 |
| 0.130 | 0.911 | −0.001 | 3.018 | 0.300 | 0.000 | 2.155 | 1.128 | 0.090 |
| 2.564 | 0.898 | −0.001 | 3.437 | 0.304 | 0.000 | 0.200 | 1.112 | 0.090 |
| 1.391 | 0.847 | −0.001 | 0.434 | 0.294 | 0.000 | 2.236 | 1.080 | 0.090 |

TABLE 1-continued

| X | Y | Z | X | Y | Z | X | Y | Z |
|---|---|---|---|---|---|---|---|---|
| 2.645 | 0.847 | −0.001 | −0.087 | 0.280 | 0.000 | 0.147 | 1.034 | 0.090 |
| 1.200 | 0.833 | −0.001 | 3.104 | 0.257 | 0.000 | 2.316 | 1.031 | 0.090 |
| 1.295 | 0.844 | −0.001 | 3.515 | 0.248 | 0.000 | 2.395 | 0.981 | 0.090 |
| 1.487 | 0.843 | −0.001 | 0.372 | 0.221 | 0.000 | 0.100 | 0.953 | 0.090 |
| 1.583 | 0.832 | −0.001 | 3.190 | 0.214 | 0.000 | 2.474 | 0.930 | 0.090 |
| 0.084 | 0.826 | 0.000 | 3.592 | 0.191 | 0.000 | 1.153 | 0.883 | 0.090 |
| 1.106 | 0.813 | 0.000 | −0.088 | 0.184 | 0.000 | 1.247 | 0.889 | 0.090 |
| 1.677 | 0.816 | 0.000 | 3.275 | 0.169 | 0.000 | 1.341 | 0.887 | 0.090 |
| 1.015 | 0.783 | 0.000 | 0.307 | 0.150 | 0.000 | 0.058 | 0.869 | 0.090 |
| 1.771 | 0.795 | 0.000 | 3.359 | 0.123 | 0.000 | 1.060 | 0.868 | 0.090 |
| 2.726 | 0.795 | 0.000 | 3.670 | 0.134 | 0.000 | 1.435 | 0.879 | 0.090 |
| 1.864 | 0.771 | 0.000 | −0.071 | 0.090 | 0.000 | 1.528 | 0.865 | 0.090 |
| 0.043 | 0.740 | 0.000 | 0.238 | 0.083 | 0.000 | 2.553 | 0.878 | 0.090 |
| 0.928 | 0.743 | 0.000 | 3.443 | 0.076 | 0.000 | 0.970 | 0.843 | 0.090 |
| 1.956 | 0.743 | 0.000 | 3.730 | 0.063 | 0.000 | 1.620 | 0.846 | 0.090 |
| 2.806 | 0.742 | 0.000 | 0.161 | 0.026 | 0.000 | 1.711 | 0.823 | 0.090 |
| 2.631 | 0.826 | 0.090 | 0.007 | 0.163 | 0.091 | 0.031 | 0.909 | 0.181 |
| 0.882 | 0.809 | 0.090 | 3.545 | 0.164 | 0.091 | 0.906 | 0.911 | 0.181 |
| 1.801 | 0.797 | 0.090 | 0.098 | 0.151 | 0.091 | 1.454 | 0.907 | 0.181 |
| 0.020 | 0.783 | 0.090 | 3.260 | 0.147 | 0.091 | 2.458 | 0.913 | 0.181 |
| 1.891 | 0.768 | 0.090 | 3.342 | 0.101 | 0.091 | 1.544 | 0.885 | 0.181 |
| 2.709 | 0.773 | 0.090 | 3.619 | 0.106 | 0.091 | 0.820 | 0.879 | 0.181 |
| 0.799 | 0.765 | 0.090 | 3.423 | 0.053 | 0.091 | 1.632 | 0.860 | 0.181 |
| 1.980 | 0.737 | 0.090 | 3.688 | 0.044 | 0.091 | 2.535 | 0.861 | 0.181 |
| 2.786 | 0.720 | 0.090 | 3.503 | 0.004 | 0.091 | 0.738 | 0.838 | 0.181 |
| 0.721 | 0.712 | 0.090 | 3.582 | −0.046 | 0.091 | −0.003 | 0.823 | 0.181 |
| 2.068 | 0.704 | 0.090 | 3.582 | −0.046 | 0.091 | 1.720 | 0.832 | 0.181 |
| −0.013 | 0.695 | 0.090 | 3.670 | −0.042 | 0.091 | 2.610 | 0.809 | 0.181 |
| 2.155 | 0.670 | 0.091 | 0.859 | 1.551 | 0.181 | 0.660 | 0.787 | 0.181 |
| 2.864 | 0.666 | 0.091 | 0.951 | 1.554 | 0.181 | 1.808 | 0.802 | 0.181 |
| 0.648 | 0.653 | 0.091 | 1.043 | 1.550 | 0.181 | 1.894 | 0.770 | 0.181 |
| 2.243 | 0.635 | 0.091 | 0.767 | 1.540 | 0.181 | 2.686 | 0.756 | 0.181 |
| 2.940 | 0.611 | 0.091 | 1.134 | 1.539 | 0.181 | −0.032 | 0.735 | 0.181 |
| −0.041 | 0.605 | 0.091 | 0.677 | 1.521 | 0.181 | 0.589 | 0.729 | 0.181 |
| 2.329 | 0.598 | 0.091 | 1.225 | 1.523 | 0.181 | 1.980 | 0.736 | 0.181 |
| 0.580 | 0.589 | 0.091 | 1.315 | 1.501 | 0.181 | 2.065 | 0.701 | 0.181 |
| 2.416 | 0.561 | 0.091 | 0.589 | 1.492 | 0.181 | 2.761 | 0.702 | 0.181 |
| 3.017 | 0.557 | 0.091 | 1.404 | 1.475 | 0.181 | 0.522 | 0.666 | 0.181 |
| −0.061 | 0.513 | 0.091 | 0.505 | 1.455 | 0.181 | 2.150 | 0.666 | 0.181 |
| 0.514 | 0.521 | 0.091 | 1.491 | 1.446 | 0.181 | −0.052 | 0.645 | 0.181 |
| 2.501 | 0.523 | 0.091 | 0.425 | 1.409 | 0.181 | 2.835 | 0.648 | 0.181 |
| 3.093 | 0.502 | 0.091 | 1.577 | 1.413 | 0.181 | 2.235 | 0.629 | 0.181 |
| 2.587 | 0.484 | 0.091 | 1.662 | 1.377 | 0.181 | 0.458 | 0.599 | 0.181 |
| 0.451 | 0.451 | 0.091 | 0.350 | 1.354 | 0.181 | 2.319 | 0.591 | 0.181 |
| 3.169 | 0.446 | 0.091 | 1.746 | 1.338 | 0.181 | 2.910 | 0.593 | 0.181 |
| 2.673 | 0.445 | 0.091 | 0.282 | 1.293 | 0.181 | −0.064 | 0.554 | 0.181 |
| −0.073 | 0.420 | 0.091 | 1.828 | 1.297 | 0.181 | 2.403 | 0.553 | 0.181 |
| 2.758 | 0.404 | 0.091 | 1.910 | 1.254 | 0.181 | 0.397 | 0.530 | 0.181 |
| 3.245 | 0.390 | 0.091 | 0.220 | 1.224 | 0.181 | 2.984 | 0.538 | 0.181 |
| 0.389 | 0.381 | 0.091 | 1.990 | 1.209 | 0.181 | 2.487 | 0.515 | 0.182 |
| 2.842 | 0.364 | 0.091 | 2.070 | 1.162 | 0.181 | 3.058 | 0.483 | 0.182 |
| 3.320 | 0.334 | 0.091 | 0.164 | 1.151 | 0.181 | 2.570 | 0.475 | 0.182 |
| −0.072 | 0.326 | 0.091 | 2.149 | 1.114 | 0.181 | −0.063 | 0.462 | 0.182 |
| 2.927 | 0.322 | 0.091 | 0.115 | 1.073 | 0.181 | 0.335 | 0.462 | 0.182 |
| 0.326 | 0.311 | 0.091 | 2.227 | 1.066 | 0.181 | 2.654 | 0.435 | 0.182 |
| 3.011 | 0.280 | 0.091 | 2.305 | 1.016 | 0.181 | 3.131 | 0.428 | 0.182 |
| 3.395 | 0.278 | 0.091 | 0.070 | 0.992 | 0.181 | 0.269 | 0.397 | 0.182 |
| 0.259 | 0.245 | 0.091 | 2.382 | 0.965 | 0.181 | 2.736 | 0.395 | 0.182 |
| 3.094 | 0.237 | 0.091 | 0.996 | 0.932 | 0.181 | −0.040 | 0.373 | 0.182 |
| −0.051 | 0.235 | 0.091 | 1.088 | 0.942 | 0.181 | 3.205 | 0.372 | 0.182 |
| 3.470 | 0.221 | 0.091 | 1.180 | 0.943 | 0.181 | 2.819 | 0.353 | 0.182 |
| 0.184 | 0.188 | 0.091 | 1.272 | 0.937 | 0.181 | 0.196 | 0.341 | 0.182 |
| 3.177 | 0.192 | 0.091 | 1.363 | 0.925 | 0.181 | 0.022 | 0.307 | 0.182 |
| 2.901 | 0.311 | 0.182 | 2.293 | 1.007 | 0.272 | 0.024 | 0.459 | 0.272 |
| 3.278 | 0.315 | 0.182 | 0.930 | 0.986 | 0.272 | 0.113 | 0.454 | 0.272 |
| 0.112 | 0.303 | 0.182 | 1.020 | 0.995 | 0.272 | 2.624 | 0.432 | 0.272 |
| 2.983 | 0.268 | 0.182 | 1.110 | 0.995 | 0.272 | 3.091 | 0.417 | 0.272 |
| 3.351 | 0.259 | 0.182 | 1.200 | 0.987 | 0.272 | 2.704 | 0.391 | 0.272 |
| 3.064 | 0.224 | 0.182 | 1.289 | 0.972 | 0.272 | 3.162 | 0.362 | 0.273 |
| 3.423 | 0.202 | 0.182 | 0.006 | 0.961 | 0.272 | 2.784 | 0.349 | 0.273 |
| 3.144 | 0.179 | 0.182 | 0.842 | 0.966 | 0.272 | 2.864 | 0.307 | 0.273 |
| 3.496 | 0.145 | 0.182 | 1.377 | 0.953 | 0.272 | 3.233 | 0.305 | 0.273 |
| 3.224 | 0.133 | 0.182 | 2.367 | 0.956 | 0.272 | 2.943 | 0.263 | 0.273 |
| 3.304 | 0.086 | 0.182 | 0.757 | 0.936 | 0.272 | 3.303 | 0.249 | 0.273 |
| 3.568 | 0.087 | 0.182 | 1.465 | 0.930 | 0.272 | 3.022 | 0.219 | 0.273 |
| 3.382 | 0.038 | 0.182 | 1.551 | 0.903 | 0.272 | 3.373 | 0.192 | 0.273 |
| 3.636 | 0.026 | 0.182 | 2.441 | 0.904 | 0.272 | 3.100 | 0.174 | 0.273 |
| 3.460 | −0.012 | 0.182 | 0.676 | 0.897 | 0.272 | 3.443 | 0.135 | 0.273 |

TABLE 1-continued

| X | Y | Z | X | Y | Z | X | Y | Z |
|---|---|---|---|---|---|---|---|---|
| 3.537 | −0.062 | 0.182 | −0.024 | 0.876 | 0.272 | 3.178 | 0.128 | 0.273 |
| 3.537 | −0.062 | 0.182 | 1.636 | 0.874 | 0.272 | 3.255 | 0.081 | 0.273 |
| 3.622 | −0.058 | 0.182 | 0.600 | 0.849 | 0.272 | 3.513 | 0.078 | 0.273 |
| 0.899 | 1.597 | 0.272 | 1.721 | 0.843 | 0.272 | 3.331 | 0.033 | 0.273 |
| 0.719 | 1.583 | 0.272 | 2.515 | 0.852 | 0.272 | 3.579 | 0.017 | 0.273 |
| 0.809 | 1.594 | 0.272 | 1.805 | 0.811 | 0.272 | 3.406 | −0.017 | 0.273 |
| 0.989 | 1.592 | 0.272 | 0.529 | 0.793 | 0.272 | 3.481 | −0.068 | 0.273 |
| 1.078 | 1.581 | 0.272 | 2.588 | 0.799 | 0.272 | 3.481 | −0.068 | 0.273 |
| 0.631 | 1.565 | 0.272 | −0.046 | 0.789 | 0.272 | 3.564 | −0.065 | 0.273 |
| 1.167 | 1.564 | 0.272 | 1.889 | 0.776 | 0.272 | 0.674 | 1.632 | 0.363 |
| 0.545 | 1.537 | 0.272 | 2.661 | 0.746 | 0.272 | 0.762 | 1.641 | 0.363 |
| 1.255 | 1.543 | 0.272 | 0.462 | 0.733 | 0.272 | 0.850 | 1.643 | 0.363 |
| 1.341 | 1.516 | 0.272 | 1.972 | 0.741 | 0.272 | 0.938 | 1.638 | 0.363 |
| 0.462 | 1.501 | 0.272 | −0.059 | 0.700 | 0.272 | 0.588 | 1.614 | 0.363 |
| 1.426 | 1.486 | 0.272 | 2.054 | 0.704 | 0.272 | 1.025 | 1.626 | 0.363 |
| 0.384 | 1.456 | 0.272 | 2.733 | 0.692 | 0.272 | 1.112 | 1.610 | 0.363 |
| 1.510 | 1.453 | 0.272 | 0.397 | 0.670 | 0.272 | 0.504 | 1.588 | 0.363 |
| 0.312 | 1.402 | 0.272 | 2.136 | 0.667 | 0.272 | 1.197 | 1.588 | 0.363 |
| 1.592 | 1.417 | 0.272 | 2.218 | 0.629 | 0.272 | 0.423 | 1.552 | 0.363 |
| 1.674 | 1.378 | 0.272 | 2.805 | 0.638 | 0.272 | 1.281 | 1.561 | 0.363 |
| 0.246 | 1.340 | 0.272 | −0.059 | 0.610 | 0.272 | 1.364 | 1.531 | 0.363 |
| 1.754 | 1.336 | 0.272 | 0.333 | 0.607 | 0.272 | 0.347 | 1.508 | 0.363 |
| 1.833 | 1.293 | 0.272 | 2.300 | 0.591 | 0.272 | 1.446 | 1.498 | 0.363 |
| 0.186 | 1.273 | 0.272 | 2.877 | 0.583 | 0.272 | 0.276 | 1.456 | 0.363 |
| 1.912 | 1.248 | 0.272 | 2.381 | 0.552 | 0.272 | 1.526 | 1.462 | 0.363 |
| 0.133 | 1.200 | 0.272 | 0.267 | 0.545 | 0.272 | 1.605 | 1.423 | 0.363 |
| 1.989 | 1.202 | 0.272 | −0.037 | 0.523 | 0.272 | 0.211 | 1.396 | 0.363 |
| 2.066 | 1.154 | 0.272 | 2.949 | 0.528 | 0.272 | 1.683 | 1.382 | 0.363 |
| 0.085 | 1.124 | 0.272 | 2.463 | 0.513 | 0.272 | 0.153 | 1.329 | 0.363 |
| 2.142 | 1.106 | 0.272 | 0.195 | 0.491 | 0.272 | 1.760 | 1.338 | 0.363 |
| 2.218 | 1.057 | 0.272 | 2.543 | 0.473 | 0.272 | 1.836 | 1.294 | 0.363 |
| 0.043 | 1.044 | 0.272 | 3.020 | 0.473 | 0.272 | 0.101 | 1.258 | 0.363 |
| 1.911 | 1.247 | 0.363 | 0.108 | 0.607 | 0.363 | 0.175 | 1.451 | 0.454 |
| 1.986 | 1.200 | 0.363 | 2.276 | 0.597 | 0.363 | 1.613 | 1.430 | 0.454 |
| 0.056 | 1.182 | 0.363 | 2.842 | 0.579 | 0.363 | 0.119 | 1.385 | 0.454 |
| 2.060 | 1.152 | 0.363 | 2.355 | 0.557 | 0.363 | 1.687 | 1.387 | 0.454 |
| 0.017 | 1.103 | 0.363 | 2.911 | 0.524 | 0.363 | 1.761 | 1.343 | 0.454 |
| 2.133 | 1.103 | 0.363 | 2.433 | 0.517 | 0.363 | 0.070 | 1.314 | 0.454 |
| 2.206 | 1.053 | 0.363 | 2.511 | 0.476 | 0.363 | 1.834 | 1.297 | 0.454 |
| 0.864 | 1.036 | 0.363 | 2.980 | 0.469 | 0.363 | 1.907 | 1.250 | 0.454 |
| 0.952 | 1.045 | 0.363 | 2.589 | 0.435 | 0.363 | 0.028 | 1.239 | 0.454 |
| 1.040 | 1.045 | 0.363 | 3.049 | 0.414 | 0.363 | 1.978 | 1.202 | 0.454 |
| 1.128 | 1.037 | 0.363 | 2.667 | 0.393 | 0.363 | −0.008 | 1.161 | 0.454 |
| −0.016 | 1.022 | 0.363 | 3.117 | 0.358 | 0.363 | 2.049 | 1.153 | 0.454 |
| 0.778 | 1.018 | 0.363 | 2.744 | 0.351 | 0.363 | 0.885 | 1.106 | 0.454 |
| 1.215 | 1.023 | 0.363 | 2.822 | 0.308 | 0.363 | 0.971 | 1.104 | 0.454 |
| 1.301 | 1.003 | 0.363 | 3.185 | 0.302 | 0.363 | 2.120 | 1.103 | 0.454 |
| 2.278 | 1.003 | 0.363 | 2.898 | 0.265 | 0.363 | 0.799 | 1.099 | 0.454 |
| 0.694 | 0.991 | 0.363 | 3.253 | 0.246 | 0.363 | 1.057 | 1.096 | 0.454 |
| 1.386 | 0.980 | 0.363 | 2.975 | 0.221 | 0.364 | −0.035 | 1.079 | 0.454 |
| 0.614 | 0.954 | 0.363 | 3.321 | 0.189 | 0.364 | 0.714 | 1.085 | 0.454 |
| 1.470 | 0.953 | 0.363 | 3.050 | 0.175 | 0.364 | 1.142 | 1.081 | 0.454 |
| 2.350 | 0.952 | 0.363 | 3.388 | 0.132 | 0.364 | 0.631 | 1.061 | 0.454 |
| −0.041 | 0.937 | 0.363 | 3.126 | 0.129 | 0.364 | 1.226 | 1.061 | 0.454 |
| 1.553 | 0.924 | 0.363 | 3.200 | 0.082 | 0.364 | 2.190 | 1.053 | 0.454 |
| 0.538 | 0.910 | 0.363 | 3.455 | 0.075 | 0.364 | 1.309 | 1.037 | 0.454 |
| 1.636 | 0.892 | 0.363 | 3.274 | 0.034 | 0.364 | 0.551 | 1.029 | 0.454 |
| 2.421 | 0.900 | 0.363 | 3.518 | 0.015 | 0.364 | 1.391 | 1.010 | 0.454 |
| 0.465 | 0.859 | 0.363 | 3.347 | −0.016 | 0.364 | −0.052 | 0.994 | 0.454 |
| 1.717 | 0.859 | 0.363 | 3.419 | −0.066 | 0.364 | 0.474 | 0.990 | 0.454 |
| −0.056 | 0.850 | 0.363 | 3.419 | −0.066 | 0.364 | 2.260 | 1.002 | 0.454 |
| 2.492 | 0.847 | 0.363 | 3.501 | −0.065 | 0.364 | 1.472 | 0.981 | 0.454 |
| 1.798 | 0.824 | 0.363 | 0.627 | 1.682 | 0.454 | 0.400 | 0.946 | 0.454 |
| 0.396 | 0.805 | 0.363 | 0.713 | 1.691 | 0.454 | 1.552 | 0.949 | 0.454 |
| 2.563 | 0.795 | 0.363 | 0.799 | 1.692 | 0.454 | 2.329 | 0.951 | 0.454 |
| 1.879 | 0.788 | 0.363 | 0.885 | 1.686 | 0.454 | −0.055 | 0.908 | 0.454 |
| −0.058 | 0.762 | 0.363 | 0.543 | 1.665 | 0.454 | 1.631 | 0.915 | 0.454 |
| 0.328 | 0.749 | 0.363 | 0.971 | 1.674 | 0.454 | 0.329 | 0.897 | 0.454 |
| 1.959 | 0.751 | 0.363 | 1.055 | 1.657 | 0.454 | 2.398 | 0.899 | 0.454 |
| 2.633 | 0.741 | 0.363 | 0.460 | 1.640 | 0.454 | 1.710 | 0.880 | 0.454 |
| 2.038 | 0.714 | 0.363 | 1.139 | 1.635 | 0.454 | 0.261 | 0.844 | 0.454 |
| 0.261 | 0.692 | 0.363 | 0.381 | 1.605 | 0.454 | 1.788 | 0.844 | 0.454 |
| 2.703 | 0.687 | 0.363 | 1.221 | 1.609 | 0.454 | 2.467 | 0.847 | 0.454 |
| −0.038 | 0.677 | 0.363 | 1.302 | 1.579 | 0.454 | −0.035 | 0.825 | 0.454 |
| 2.118 | 0.675 | 0.363 | 0.307 | 1.562 | 0.454 | 1.866 | 0.806 | 0.454 |
| 0.189 | 0.641 | 0.363 | 1.381 | 1.546 | 0.454 | 0.190 | 0.795 | 0.454 |
| 2.197 | 0.636 | 0.363 | 0.237 | 1.511 | 0.454 | 2.535 | 0.794 | 0.454 |
| 2.773 | 0.633 | 0.363 | 1.460 | 1.510 | 0.454 | 0.026 | 0.766 | 0.454 |

TABLE 1-continued

| X | Y | Z | X | Y | Z | X | Y | Z |
|---|---|---|---|---|---|---|---|---|
| 0.022 | 0.614 | 0.363 | 1.537 | 1.471 | 0.454 | 1.943 | 0.768 | 0.454 |
| 0.110 | 0.762 | 0.454 | 0.263 | 1.621 | 0.544 | 1.699 | 0.906 | 0.545 |
| 2.603 | 0.740 | 0.454 | 1.237 | 1.632 | 0.544 | 2.371 | 0.901 | 0.545 |
| 2.020 | 0.728 | 0.454 | 1.314 | 1.599 | 0.544 | 1.774 | 0.868 | 0.545 |
| 2.096 | 0.689 | 0.454 | 0.196 | 1.568 | 0.545 | 2.437 | 0.848 | 0.545 |
| 2.670 | 0.687 | 0.454 | 1.391 | 1.562 | 0.545 | 1.849 | 0.828 | 0.545 |
| 2.173 | 0.649 | 0.454 | 1.466 | 1.523 | 0.545 | 1.924 | 0.788 | 0.545 |
| 2.737 | 0.633 | 0.454 | 0.137 | 1.508 | 0.545 | 2.503 | 0.795 | 0.545 |
| 2.249 | 0.608 | 0.454 | 1.540 | 1.483 | 0.545 | 1.998 | 0.748 | 0.545 |
| 2.804 | 0.578 | 0.454 | 0.084 | 1.442 | 0.545 | 2.569 | 0.742 | 0.545 |
| 2.325 | 0.567 | 0.454 | 1.613 | 1.440 | 0.545 | 2.072 | 0.707 | 0.545 |
| 2.400 | 0.526 | 0.454 | 1.685 | 1.395 | 0.545 | 2.634 | 0.688 | 0.545 |
| 2.871 | 0.523 | 0.454 | 0.039 | 1.371 | 0.545 | 2.146 | 0.665 | 0.545 |
| 2.476 | 0.484 | 0.454 | 1.756 | 1.350 | 0.545 | 2.219 | 0.623 | 0.545 |
| 2.937 | 0.468 | 0.454 | 1.826 | 1.303 | 0.545 | 2.699 | 0.634 | 0.545 |
| 2.551 | 0.442 | 0.454 | 0.001 | 1.295 | 0.545 | 2.293 | 0.581 | 0.545 |
| 3.004 | 0.413 | 0.454 | 1.896 | 1.255 | 0.545 | 2.764 | 0.580 | 0.545 |
| 2.627 | 0.400 | 0.454 | −0.029 | 1.216 | 0.545 | 2.366 | 0.539 | 0.545 |
| 2.702 | 0.358 | 0.454 | 1.965 | 1.206 | 0.545 | 2.829 | 0.525 | 0.545 |
| 3.069 | 0.358 | 0.454 | 0.734 | 1.179 | 0.545 | 2.439 | 0.496 | 0.545 |
| 2.776 | 0.314 | 0.454 | 0.818 | 1.182 | 0.545 | 2.893 | 0.470 | 0.545 |
| 3.135 | 0.302 | 0.454 | 0.903 | 1.178 | 0.545 | 2.512 | 0.454 | 0.545 |
| 2.851 | 0.271 | 0.454 | 0.650 | 1.167 | 0.545 | 2.957 | 0.415 | 0.545 |
| 3.201 | 0.246 | 0.454 | 0.987 | 1.167 | 0.545 | 2.585 | 0.411 | 0.545 |
| 2.924 | 0.226 | 0.454 | 2.034 | 1.156 | 0.545 | 2.658 | 0.367 | 0.545 |
| 3.266 | 0.190 | 0.454 | 0.568 | 1.148 | 0.545 | 3.021 | 0.359 | 0.545 |
| 2.998 | 0.181 | 0.454 | 1.070 | 1.151 | 0.545 | 2.730 | 0.323 | 0.545 |
| 3.071 | 0.134 | 0.454 | −0.048 | 1.133 | 0.545 | 3.084 | 0.303 | 0.545 |
| 3.331 | 0.133 | 0.454 | 1.152 | 1.130 | 0.545 | 2.802 | 0.279 | 0.545 |
| 3.143 | 0.087 | 0.454 | 0.488 | 1.120 | 0.545 | 3.148 | 0.247 | 0.545 |
| 3.396 | 0.076 | 0.455 | 1.233 | 1.105 | 0.545 | 2.873 | 0.233 | 0.545 |
| 3.214 | 0.039 | 0.455 | 2.102 | 1.106 | 0.545 | 2.944 | 0.188 | 0.545 |
| 3.456 | 0.015 | 0.455 | 0.411 | 1.085 | 0.545 | 3.211 | 0.191 | 0.545 |
| 3.285 | −0.011 | 0.455 | 1.312 | 1.077 | 0.545 | 3.015 | 0.141 | 0.545 |
| 3.355 | −0.061 | 0.455 | 2.170 | 1.056 | 0.545 | 3.274 | 0.134 | 0.545 |
| 3.355 | −0.061 | 0.455 | −0.052 | 1.049 | 0.545 | 3.085 | 0.093 | 0.545 |
| 3.435 | −0.063 | 0.455 | 0.337 | 1.044 | 0.545 | 3.337 | 0.078 | 0.545 |
| 0.576 | 1.740 | 0.544 | 1.391 | 1.047 | 0.545 | 3.154 | 0.045 | 0.545 |
| 0.660 | 1.748 | 0.544 | 1.469 | 1.014 | 0.545 | 3.393 | 0.016 | 0.545 |
| 0.745 | 1.748 | 0.544 | 0.266 | 0.997 | 0.545 | 3.223 | −0.005 | 0.545 |
| 0.829 | 1.741 | 0.544 | 2.237 | 1.005 | 0.545 | 3.290 | −0.056 | 0.545 |
| 0.493 | 1.724 | 0.544 | 1.546 | 0.979 | 0.545 | 3.290 | −0.056 | 0.545 |
| 0.913 | 1.729 | 0.544 | −0.030 | 0.968 | 0.545 | 3.369 | −0.059 | 0.545 |
| 0.996 | 1.711 | 0.544 | 0.196 | 0.950 | 0.545 | 0.523 | 1.804 | 0.635 |
| 0.412 | 1.698 | 0.544 | 1.623 | 0.943 | 0.545 | 0.605 | 1.812 | 0.635 |
| 1.077 | 1.689 | 0.544 | 2.304 | 0.953 | 0.545 | 0.688 | 1.812 | 0.635 |
| 0.335 | 1.664 | 0.544 | 0.035 | 0.916 | 0.545 | 0.771 | 1.805 | 0.635 |
| 1.158 | 1.662 | 0.544 | 0.118 | 0.917 | 0.545 | 0.441 | 1.787 | 0.635 |
| 0.853 | 1.791 | 0.635 | 2.146 | 1.060 | 0.636 | 3.304 | −0.056 | 0.636 |
| 0.934 | 1.772 | 0.635 | 1.465 | 1.051 | 0.636 | 0.466 | 1.874 | 0.726 |
| 0.362 | 1.761 | 0.635 | 1.540 | 1.014 | 0.636 | 0.548 | 1.882 | 0.726 |
| 1.014 | 1.749 | 0.635 | 2.211 | 1.008 | 0.636 | 0.630 | 1.883 | 0.726 |
| 0.287 | 1.726 | 0.635 | 1.613 | 0.975 | 0.636 | 0.711 | 1.875 | 0.726 |
| 1.093 | 1.721 | 0.635 | 2.276 | 0.957 | 0.636 | 0.386 | 1.856 | 0.726 |
| 1.170 | 1.690 | 0.635 | 1.686 | 0.936 | 0.636 | 0.792 | 1.861 | 0.726 |
| 0.218 | 1.680 | 0.635 | 2.341 | 0.904 | 0.636 | 0.872 | 1.841 | 0.726 |
| 1.246 | 1.656 | 0.635 | 1.759 | 0.895 | 0.636 | 0.309 | 1.828 | 0.726 |
| 0.155 | 1.625 | 0.635 | 1.832 | 0.854 | 0.636 | 0.950 | 1.816 | 0.726 |
| 1.320 | 1.619 | 0.635 | 2.405 | 0.851 | 0.636 | 0.237 | 1.789 | 0.726 |
| 1.394 | 1.579 | 0.635 | 1.904 | 0.813 | 0.636 | 1.027 | 1.787 | 0.726 |
| 0.099 | 1.564 | 0.635 | 2.469 | 0.798 | 0.636 | 1.102 | 1.755 | 0.726 |
| 1.466 | 1.538 | 0.635 | 1.976 | 0.771 | 0.636 | 0.171 | 1.740 | 0.726 |
| 0.050 | 1.496 | 0.635 | 2.533 | 0.745 | 0.636 | 1.176 | 1.719 | 0.726 |
| 1.537 | 1.495 | 0.635 | 2.047 | 0.728 | 0.636 | 0.113 | 1.683 | 0.726 |
| 1.607 | 1.450 | 0.635 | 2.596 | 0.691 | 0.636 | 1.249 | 1.681 | 0.726 |
| 0.010 | 1.424 | 0.636 | 2.119 | 0.686 | 0.636 | 1.320 | 1.641 | 0.726 |
| 1.677 | 1.405 | 0.636 | 2.190 | 0.643 | 0.636 | 0.061 | 1.619 | 0.726 |
| 1.745 | 1.358 | 0.636 | 2.659 | 0.637 | 0.636 | 1.390 | 1.598 | 0.726 |
| −0.022 | 1.347 | 0.636 | 2.261 | 0.599 | 0.636 | 0.018 | 1.549 | 0.726 |
| 1.813 | 1.310 | 0.636 | 2.722 | 0.582 | 0.636 | 1.459 | 1.554 | 0.726 |
| 0.591 | 1.269 | 0.636 | 2.332 | 0.556 | 0.636 | 1.528 | 1.509 | 0.726 |
| 0.674 | 1.278 | 0.636 | 2.403 | 0.512 | 0.636 | −0.016 | 1.474 | 0.726 |
| 0.757 | 1.278 | 0.636 | 2.785 | 0.527 | 0.636 | 1.596 | 1.463 | 0.726 |
| 0.840 | 1.270 | 0.636 | 2.473 | 0.468 | 0.636 | 1.663 | 1.415 | 0.726 |
| −0.043 | 1.266 | 0.636 | 2.847 | 0.472 | 0.636 | −0.038 | 1.395 | 0.726 |
| 0.510 | 1.252 | 0.636 | 2.544 | 0.424 | 0.636 | 0.536 | 1.384 | 0.726 |
| 0.922 | 1.255 | 0.636 | 2.909 | 0.417 | 0.636 | 0.618 | 1.390 | 0.726 |
| 1.881 | 1.261 | 0.636 | 2.614 | 0.379 | 0.636 | 0.700 | 1.387 | 0.726 |

TABLE 1-continued

| X | Y | Z | X | Y | Z | X | Y | Z |
|---|---|---|---|---|---|---|---|---|
| 1.002 | 1.236 | 0.636 | 2.971 | 0.361 | 0.636 | 0.781 | 1.376 | 0.726 |
| 0.430 | 1.227 | 0.636 | 2.684 | 0.334 | 0.636 | 0.456 | 1.367 | 0.726 |
| 1.082 | 1.212 | 0.636 | 3.033 | 0.305 | 0.636 | 0.861 | 1.358 | 0.726 |
| 1.948 | 1.212 | 0.636 | 2.753 | 0.289 | 0.636 | 1.729 | 1.367 | 0.726 |
| 0.355 | 1.193 | 0.636 | 2.823 | 0.242 | 0.636 | 0.379 | 1.339 | 0.726 |
| −0.046 | 1.183 | 0.636 | 3.094 | 0.249 | 0.636 | 0.940 | 1.335 | 0.726 |
| 1.161 | 1.185 | 0.636 | 2.891 | 0.196 | 0.636 | −0.037 | 1.314 | 0.726 |
| 2.014 | 1.162 | 0.636 | 3.155 | 0.193 | 0.636 | 0.304 | 1.305 | 0.726 |
| 0.282 | 1.152 | 0.636 | 2.960 | 0.148 | 0.636 | 1.017 | 1.307 | 0.726 |
| 1.238 | 1.155 | 0.636 | 3.216 | 0.136 | 0.636 | 1.795 | 1.319 | 0.726 |
| 0.211 | 1.109 | 0.636 | 3.027 | 0.100 | 0.636 | 1.093 | 1.276 | 0.727 |
| 1.315 | 1.122 | 0.636 | 3.277 | 0.080 | 0.636 | 0.232 | 1.267 | 0.727 |
| 2.080 | 1.111 | 0.636 | 3.095 | 0.051 | 0.636 | 1.861 | 1.269 | 0.727 |
| −0.017 | 1.106 | 0.636 | 3.331 | 0.017 | 0.636 | 0.001 | 1.243 | 0.727 |
| 1.391 | 1.088 | 0.636 | 3.161 | 0.001 | 0.636 | 1.168 | 1.243 | 0.727 |
| 0.053 | 1.066 | 0.636 | 3.227 | −0.051 | 0.636 | 0.158 | 1.231 | 0.727 |
| 0.136 | 1.074 | 0.636 | 3.227 | −0.051 | 0.636 | 0.077 | 1.217 | 0.727 |
| 1.242 | 1.208 | 0.727 | 3.218 | 0.081 | 0.727 | 1.030 | 1.385 | 0.817 |
| 1.926 | 1.219 | 0.727 | 3.035 | 0.057 | 0.727 | 1.707 | 1.383 | 0.817 |
| 1.315 | 1.170 | 0.727 | 3.269 | 0.018 | 0.727 | 1.103 | 1.349 | 0.817 |
| 1.990 | 1.169 | 0.727 | 3.100 | 0.006 | 0.727 | 1.771 | 1.333 | 0.817 |
| 1.387 | 1.132 | 0.727 | 3.163 | −0.046 | 0.727 | 1.174 | 1.311 | 0.817 |
| 2.054 | 1.118 | 0.727 | 3.163 | −0.046 | 0.727 | 1.834 | 1.283 | 0.817 |
| 1.459 | 1.092 | 0.727 | 3.240 | −0.053 | 0.727 | 1.245 | 1.271 | 0.817 |
| 2.118 | 1.066 | 0.727 | 0.483 | 1.959 | 0.817 | 1.315 | 1.229 | 0.817 |
| 1.530 | 1.051 | 0.727 | 0.564 | 1.959 | 0.817 | 1.898 | 1.232 | 0.817 |
| 2.182 | 1.014 | 0.727 | 0.645 | 1.951 | 0.817 | 1.384 | 1.187 | 0.817 |
| 1.601 | 1.010 | 0.727 | 0.403 | 1.950 | 0.817 | 1.960 | 1.181 | 0.817 |
| 1.672 | 0.969 | 0.727 | 0.725 | 1.937 | 0.817 | 1.453 | 1.144 | 0.818 |
| 2.245 | 0.962 | 0.727 | 0.324 | 1.930 | 0.817 | 2.023 | 1.129 | 0.818 |
| 1.743 | 0.927 | 0.727 | 0.803 | 1.916 | 0.817 | 1.521 | 1.101 | 0.818 |
| 2.308 | 0.909 | 0.727 | 0.249 | 1.899 | 0.817 | 2.085 | 1.077 | 0.818 |
| 1.813 | 0.884 | 0.727 | 0.880 | 1.891 | 0.817 | 1.589 | 1.057 | 0.818 |
| 2.370 | 0.856 | 0.727 | 0.180 | 1.857 | 0.817 | 2.147 | 1.025 | 0.818 |
| 1.883 | 0.841 | 0.727 | 0.956 | 1.861 | 0.817 | 1.657 | 1.012 | 0.818 |
| 1.952 | 0.798 | 0.727 | 1.029 | 1.827 | 0.817 | 2.208 | 0.972 | 0.818 |
| 2.433 | 0.802 | 0.727 | 0.118 | 1.805 | 0.817 | 1.725 | 0.968 | 0.818 |
| 2.022 | 0.754 | 0.727 | 1.102 | 1.791 | 0.817 | 1.792 | 0.922 | 0.818 |
| 2.495 | 0.749 | 0.727 | 0.064 | 1.744 | 0.817 | 2.270 | 0.918 | 0.818 |
| 2.091 | 0.710 | 0.727 | 1.173 | 1.752 | 0.817 | 1.860 | 0.877 | 0.818 |
| 2.556 | 0.695 | 0.727 | 1.243 | 1.710 | 0.817 | 2.331 | 0.865 | 0.818 |
| 2.160 | 0.666 | 0.727 | 0.019 | 1.677 | 0.817 | 1.927 | 0.831 | 0.818 |
| 2.618 | 0.640 | 0.727 | 1.311 | 1.667 | 0.817 | 2.391 | 0.811 | 0.818 |
| 2.229 | 0.621 | 0.727 | 1.379 | 1.622 | 0.817 | 1.993 | 0.785 | 0.818 |
| 2.679 | 0.585 | 0.727 | −0.017 | 1.604 | 0.817 | 2.452 | 0.757 | 0.818 |
| 2.297 | 0.576 | 0.727 | 1.446 | 1.576 | 0.817 | 2.060 | 0.739 | 0.818 |
| 2.366 | 0.531 | 0.727 | −0.040 | 1.527 | 0.817 | 2.512 | 0.702 | 0.818 |
| 2.740 | 0.530 | 0.727 | 1.512 | 1.529 | 0.817 | 2.126 | 0.693 | 0.818 |
| 2.434 | 0.486 | 0.727 | 0.484 | 1.507 | 0.817 | 2.571 | 0.647 | 0.818 |
| 2.800 | 0.475 | 0.727 | 0.565 | 1.514 | 0.817 | 2.193 | 0.646 | 0.818 |
| 2.502 | 0.440 | 0.727 | 0.646 | 1.509 | 0.817 | 2.259 | 0.599 | 0.818 |
| 2.861 | 0.420 | 0.727 | 0.405 | 1.489 | 0.817 | 2.631 | 0.592 | 0.818 |
| 2.570 | 0.394 | 0.727 | 0.726 | 1.496 | 0.817 | 2.325 | 0.552 | 0.818 |
| 2.921 | 0.364 | 0.727 | 0.804 | 1.475 | 0.817 | 2.690 | 0.537 | 0.818 |
| 2.638 | 0.347 | 0.727 | 1.577 | 1.481 | 0.817 | 2.391 | 0.505 | 0.818 |
| 2.981 | 0.308 | 0.727 | 0.328 | 1.464 | 0.817 | 2.749 | 0.481 | 0.818 |
| 2.705 | 0.300 | 0.727 | −0.032 | 1.447 | 0.817 | 2.457 | 0.457 | 0.818 |
| 2.772 | 0.253 | 0.727 | 0.881 | 1.449 | 0.817 | 2.808 | 0.425 | 0.818 |
| 3.040 | 0.252 | 0.727 | 0.254 | 1.432 | 0.817 | 2.523 | 0.409 | 0.818 |
| 2.838 | 0.205 | 0.727 | 0.956 | 1.419 | 0.817 | 2.588 | 0.361 | 0.818 |
| 3.100 | 0.195 | 0.727 | 1.642 | 1.432 | 0.817 | 2.867 | 0.369 | 0.818 |
| 2.905 | 0.156 | 0.727 | 0.022 | 1.388 | 0.817 | 2.653 | 0.313 | 0.818 |
| 3.159 | 0.138 | 0.727 | 0.180 | 1.398 | 0.817 | 2.925 | 0.313 | 0.818 |
| 2.970 | 0.107 | 0.727 | 0.101 | 1.378 | 0.817 | 2.718 | 0.264 | 0.818 |
| 2.983 | 0.256 | 0.818 | 0.048 | 1.549 | 0.908 | 2.752 | 0.437 | 0.909 |
| 2.782 | 0.215 | 0.818 | 0.128 | 1.548 | 0.908 | 2.534 | 0.381 | 0.909 |
| 3.042 | 0.200 | 0.818 | 0.899 | 1.542 | 0.908 | 2.809 | 0.381 | 0.909 |
| 2.847 | 0.165 | 0.818 | 0.971 | 1.505 | 0.908 | 2.597 | 0.331 | 0.909 |
| 3.099 | 0.143 | 0.818 | 1.555 | 1.507 | 0.908 | 2.867 | 0.325 | 0.909 |
| 2.910 | 0.115 | 0.818 | 1.041 | 1.467 | 0.908 | 2.660 | 0.281 | 0.909 |
| 3.157 | 0.085 | 0.818 | 1.618 | 1.457 | 0.908 | 2.924 | 0.268 | 0.909 |
| 2.974 | 0.065 | 0.818 | 1.110 | 1.426 | 0.908 | 2.723 | 0.231 | 0.909 |
| 3.205 | 0.022 | 0.818 | 1.680 | 1.407 | 0.908 | 2.980 | 0.211 | 0.909 |
| 3.036 | 0.013 | 0.818 | 1.179 | 1.384 | 0.908 | 2.786 | 0.181 | 0.909 |

TABLE 1-continued

| X | Y | Z | X | Y | Z | X | Y | Z |
|---|---|---|---|---|---|---|---|---|
| 3.099 | −0.039 | 0.818 | 1.742 | 1.356 | 0.908 | 3.037 | 0.154 | 0.909 |
| 3.099 | −0.039 | 0.818 | 1.246 | 1.340 | 0.908 | 2.848 | 0.130 | 0.909 |
| 3.174 | −0.048 | 0.818 | 1.313 | 1.295 | 0.908 | 3.093 | 0.097 | 0.909 |
| 0.418 | 2.050 | 0.908 | 1.804 | 1.304 | 0.908 | 2.910 | 0.079 | 0.909 |
| 0.498 | 2.050 | 0.908 | 1.379 | 1.250 | 0.908 | 2.971 | 0.027 | 0.909 |
| 0.338 | 2.040 | 0.908 | 1.865 | 1.253 | 0.908 | 3.139 | 0.032 | 0.909 |
| 0.578 | 2.041 | 0.908 | 1.445 | 1.204 | 0.908 | 3.032 | −0.025 | 0.909 |
| 0.261 | 2.019 | 0.908 | 1.927 | 1.201 | 0.908 | 3.032 | −0.025 | 0.909 |
| 0.657 | 2.025 | 0.908 | 1.510 | 1.157 | 0.908 | 3.107 | −0.036 | 0.909 |
| 0.734 | 2.004 | 0.908 | 1.987 | 1.148 | 0.908 | 0.417 | 2.149 | 0.999 |
| 0.188 | 1.985 | 0.908 | 1.575 | 1.110 | 0.908 | 0.337 | 2.147 | 0.999 |
| 0.810 | 1.977 | 0.908 | 2.048 | 1.095 | 0.908 | 0.496 | 2.142 | 0.999 |
| 0.123 | 1.939 | 0.908 | 1.640 | 1.063 | 0.908 | 0.259 | 2.132 | 0.999 |
| 0.884 | 1.945 | 0.908 | 2.108 | 1.042 | 0.908 | 0.574 | 2.126 | 0.999 |
| 0.956 | 1.911 | 0.908 | 1.705 | 1.015 | 0.908 | 0.184 | 2.105 | 0.999 |
| 0.066 | 1.882 | 0.908 | 2.168 | 0.988 | 0.908 | 0.651 | 2.104 | 0.999 |
| 1.027 | 1.873 | 0.908 | 1.769 | 0.967 | 0.909 | 0.726 | 2.076 | 0.999 |
| 1.097 | 1.833 | 0.908 | 2.227 | 0.935 | 0.909 | 0.115 | 2.064 | 0.999 |
| 0.018 | 1.817 | 0.908 | 1.833 | 0.919 | 0.909 | 0.799 | 2.044 | 0.999 |
| 1.165 | 1.790 | 0.908 | 2.287 | 0.880 | 0.909 | 0.057 | 2.010 | 0.999 |
| −0.019 | 1.746 | 0.908 | 1.897 | 0.870 | 0.909 | 0.871 | 2.009 | 0.999 |
| 1.232 | 1.746 | 0.908 | 2.346 | 0.826 | 0.909 | 0.940 | 1.970 | 0.999 |
| 1.298 | 1.700 | 0.908 | 1.961 | 0.822 | 0.909 | 0.010 | 1.945 | 0.999 |
| −0.037 | 1.668 | 0.908 | 2.025 | 0.773 | 0.909 | 1.008 | 1.928 | 0.999 |
| 1.363 | 1.653 | 0.908 | 2.405 | 0.771 | 0.909 | 1.075 | 1.885 | 0.999 |
| 0.435 | 1.641 | 0.908 | 2.089 | 0.724 | 0.909 | −0.026 | 1.874 | 0.999 |
| 0.515 | 1.647 | 0.908 | 2.463 | 0.716 | 0.909 | 1.141 | 1.840 | 0.999 |
| 0.595 | 1.641 | 0.908 | 2.153 | 0.675 | 0.909 | −0.036 | 1.796 | 0.999 |
| 0.356 | 1.625 | 0.908 | 2.521 | 0.661 | 0.909 | 0.383 | 1.796 | 0.999 |
| 0.674 | 1.626 | 0.908 | 2.216 | 0.626 | 0.909 | 0.463 | 1.804 | 0.999 |
| 0.280 | 1.600 | 0.908 | 2.579 | 0.605 | 0.909 | 0.542 | 1.798 | 0.999 |
| 0.751 | 1.603 | 0.908 | 2.280 | 0.577 | 0.909 | 0.620 | 1.781 | 0.999 |
| 1.427 | 1.605 | 0.908 | 2.637 | 0.550 | 0.909 | 1.206 | 1.793 | 0.999 |
| −0.018 | 1.592 | 0.908 | 2.344 | 0.528 | 0.909 | 0.306 | 1.775 | 0.999 |
| 0.205 | 1.571 | 0.908 | 2.695 | 0.494 | 0.909 | 0.696 | 1.755 | 0.999 |
| 0.826 | 1.575 | 0.908 | 2.407 | 0.479 | 0.909 | 0.232 | 1.745 | 0.999 |
| 1.491 | 1.556 | 0.908 | 2.471 | 0.430 | 0.909 | 1.270 | 1.745 | 0.999 |
| 0.004 | 1.730 | 0.999 | 2.228 | 0.614 | 1.000 | | | |
| 0.158 | 1.717 | 0.999 | 2.578 | 0.575 | 1.000 | | | |
| 0.768 | 1.722 | 0.999 | 2.290 | 0.563 | 1.000 | | | |
| 0.079 | 1.706 | 0.999 | 2.352 | 0.513 | 1.000 | | | |
| 0.839 | 1.685 | 0.999 | 2.634 | 0.518 | 1.000 | | | |
| 1.333 | 1.697 | 0.999 | 2.413 | 0.462 | 1.000 | | | |
| 0.908 | 1.645 | 0.999 | 2.691 | 0.462 | 1.000 | | | |
| 1.396 | 1.647 | 0.999 | 2.475 | 0.411 | 1.000 | | | |
| 0.976 | 1.603 | 0.999 | 2.747 | 0.405 | 1.000 | | | |
| 1.458 | 1.597 | 0.999 | 2.537 | 0.360 | 1.000 | | | |
| 1.043 | 1.559 | 0.999 | 2.803 | 0.348 | 1.000 | | | |
| 1.520 | 1.546 | 0.999 | 2.598 | 0.309 | 1.000 | | | |
| 1.108 | 1.513 | 0.999 | 2.858 | 0.291 | 1.000 | | | |
| 1.581 | 1.495 | 0.999 | 2.659 | 0.258 | 1.000 | | | |
| 1.173 | 1.466 | 0.999 | 2.914 | 0.234 | 1.000 | | | |
| 1.642 | 1.444 | 0.999 | 2.721 | 0.207 | 1.000 | | | |
| 1.237 | 1.419 | 0.999 | 2.970 | 0.176 | 1.000 | | | |
| 1.702 | 1.392 | 0.999 | 2.782 | 0.156 | 1.000 | | | |
| 1.300 | 1.370 | 0.999 | 3.025 | 0.119 | 1.000 | | | |
| 1.763 | 1.339 | 0.999 | 2.842 | 0.104 | 1.000 | | | |
| 1.363 | 1.321 | 0.999 | 2.903 | 0.052 | 1.000 | | | |
| 1.823 | 1.286 | 0.999 | 3.070 | 0.054 | 1.000 | | | |
| 1.426 | 1.271 | 0.999 | 2.963 | −0.001 | 1.000 | | | |
| 1.882 | 1.233 | 0.999 | 2.963 | −0.001 | 1.000 | | | |
| 1.488 | 1.222 | 0.999 | 3.037 | −0.013 | 1.000 | | | |
| 1.550 | 1.172 | 0.999 | | | | | | |
| 1.942 | 1.180 | 0.999 | | | | | | |
| 1.612 | 1.121 | 0.999 | | | | | | |
| 2.001 | 1.126 | 0.999 | | | | | | |
| 1.674 | 1.071 | 0.999 | | | | | | |
| 2.059 | 1.072 | 0.999 | | | | | | |
| 1.736 | 1.020 | 0.999 | | | | | | |
| 2.118 | 1.018 | 0.999 | | | | | | |
| 1.797 | 0.970 | 0.999 | | | | | | |
| 2.176 | 0.963 | 0.999 | | | | | | |
| 1.859 | 0.919 | 0.999 | | | | | | |
| 2.234 | 0.909 | 0.999 | | | | | | |
| 1.921 | 0.868 | 0.999 | | | | | | |
| 2.292 | 0.853 | 1.000 | | | | | | |
| 1.982 | 0.817 | 1.000 | | | | | | |
| 2.350 | 0.798 | 1.000 | | | | | | |

TABLE 1-continued

| X | Y | Z | X | Y | Z | X | Y | Z |
|---|---|---|---|---|---|---|---|---|
| 2.044 | 0.766 | 1.000 | | | | | | |
| 2.407 | 0.743 | 1.000 | | | | | | |
| 2.105 | 0.716 | 1.000 | | | | | | |
| 2.464 | 0.687 | 1.000 | | | | | | |
| 2.167 | 0.665 | 1.000 | | | | | | |
| 2.521 | 0.631 | 1.000 | | | | | | |

One of ordinary skill in the art will appreciate that the airfoil shape disclosed in the above Table 1 may be scaled up or down geometrically for use in other turbine stages or types of turbines, including use in steam turbine or aircraft engine. Consequently, the coordinate values set forth in Table 1 may be scaled upwardly or downwardly such that the airfoil shape remains unchanged. The scaled version of the coordinates in Table 1 would be represented by X, Y and Z coordinate values of Table 1 with X and Y and Z coordinates multiplied or divided by a constant number. Further, variances to the airfoil shape may be made such that a small percentage of the points listed in Table 1 are avoided, though the operation and shape of the airfoil remain substantially the same. These variances may include airfoil shapes where up to 5% of the points listed in Table 1 are avoided. As one of ordinary skill in the art will appreciate, air foil shapes of this nature are within the scope of the present application.

As stated, turbine buckets, and in particular turbine airfoils, are used to convert the kinetic energy of the expanding flow of working fluid into the mechanical energy of the rotating shaft, which may then be used by a generator to produce electrical power. The configuration of the airfoil (along with its interaction with surrounding airfoils), as embodied by the invention herein, provides for stage efficiency, enhanced aeromechanics, smooth laminar flow from stage to stage, reduced thermal stresses, enhanced interrelation of the stages to effectively pass the airflow from stage to stage, and reduced mechanical stresses, among other beneficial aspects.

The desirable operation aspects of fluid flow dynamics and laminar flow, among others (including the desirable interaction with surrounding airfoils) that stem from an airfoil according to the current invention may be verified by various means. For example, fluid flow from a preceding/upstream airfoil intersects with the airfoil, as embodied by the invention, and via the configuration of the instant airfoil, flow over and around the airfoil is enhanced. In particular, the fluid dynamics and laminar flow from the airfoil, as embodied by the present invention, is enhanced. There is a smooth transition fluid flow from the preceding/upstream airfoil(s) and nozzle(s) and a smooth transition fluid flow to the adjacent/downstream airfoil(s) and nozzle(s). Moreover, the flow from the airfoil according to the current invention proceeds to the adjacent/downstream airfoil(s) and nozzle(s) is enhanced due to the enhanced laminar fluid flow off of the airfoil. Therefore, the shape of the airfoil, as embodied by the present invention, assists in the prevention of turbulent fluid flow in the turbine unit and, thus, aids in promoting the more efficient conversion of the kinetic energy of the flow into the mechanical energy of the rotating shaft through the turbine unit.

Further, but in no way limiting of the invention, the effectiveness of the airfoil configuration according to the present invention (with or without fluid flow interaction) may be quantified by computational fluid dynamics (CFD); traditional fluid dynamics analysis; Euler and Navier-Stokes equations; for transfer functions, algorithms, manufacturing: manual positioning, flow testing (for example in wind tunnels), and modification of the airfoil; in-situ testing; modeling: application of scientific principles to design or develop the airfoils, machines, apparatus, or manufacturing processes; airfoil flow testing and modification; combinations thereof, and other design processes and practices. These methods of determination are merely exemplary, and are not intended to limit the invention in any manner.

As noted above, the airfoil configuration (along with its interaction with surrounding airfoils), as embodied by the current invention, including its peripheral surface provides for stage airflow efficiency, enhanced aeromechanics, smooth laminar flow from stage to stage, reduced thermal stresses, enhanced interrelation of the stages to effectively pass the airflow from stage to stage, and reduced mechanical stresses, among other desirable aspects of the invention, compared to other similar airfoils, which have like applications. For example, and in no way limiting of the invention, the airfoil of the present invention may provide an increased efficiency over other conventional airfoils that may be used for the same function. This increased efficiency, in addition to the above-noted advantages, provides a power output with a decrease in required fuel, therefore inherently decreasing emissions. Of course, other such advantages are also within the scope of the invention.

While the invention has been described in connection with what is presently considered to be the most practical and preferred embodiment, it is to be understood that the invention is not to be limited to the disclosed embodiments, but, on the contrary, is intended to cover various modifications and equivalent arrangements included within the spirit and scope of the appended claims.

We claim:

1. A turbine bucket including an airfoil, the airfoil having a nominal profile substantially in accordance with Cartesian coordinate values of X, Y and Z set forth in Table 1 wherein the Z values are non-dimensional values from approximately 0 to 1 convertible to Z distances in inches by multiplying the Z values by a height of the airfoil in inches, and wherein X and Y are distances in inches which, when connected by substantially smooth continuing arcs, define airfoil profile sections at each distance Z, the profile sections at the Z distances being joined substantially smoothly with one another to form a complete airfoil shape.

2. The turbine bucket according to claim 1, wherein the turbine bucket is configured to function as a second stage turbine bucket in a turbine.

3. The turbine bucket according to claim 2, wherein the turbine is a gas turbine.

4. The turbine bucket according to claim 1, wherein the shape of the airfoil lies in an envelope within approximately +/−0.04 inches in a direction normal to any surface location of the airfoil.

5. The turbine bucket according to claim 1, wherein the height of the turbine bucket is approximately 17 to 19 inches.

6. The turbine bucket according to claim 1, wherein the height of the airfoil is approximately 10 to 11 inches.

7. A turbine bucket including an airfoil having an uncoated nominal airfoil profile substantially in accordance with Cartesian coordinate values of X, Y and Z set forth in Table 1 wherein the Z values are non-dimensional values from approximately 0 to 1 convertible to Z distances in inches by multiplying the Z values by a height of the airfoil in inches, and wherein X and Y are distances in inches which, when connected by smooth continuing arcs, define airfoil profile sections at each Z distance, the profile sections at the Z distances being joined smoothly with one another to form a complete airfoil shape, the X, Y and Z distances being scalable as a function of the same constant or number to provide a scaled-up or scaled-down airfoil.

8. The turbine bucket according to claim 7, wherein the turbine bucket is configured to function as a second stage turbine bucket in a turbine.

9. The turbine bucket according to claim 8, wherein the turbine is a gas turbine.

10. The turbine bucket according to claim 7, wherein the shape of the airfoil lies in an envelope within approximately +/−0.04 inches in a direction normal to any surface location of the airfoil.

11. The turbine bucket according to claim 7, wherein the height of the turbine bucket is approximately 17 to 19 inches.

12. The turbine bucket according to claim 7, wherein the height of the airfoil is approximately 10 to 11 inches.

13. A turbine bucket including an airfoil having an airfoil shape, said airfoil having a nominal profile substantially in accordance with at least approximately 95% of the Cartesian coordinate values of X, Y and Z set forth in Table 1 wherein the Z values are non-dimensional values from approximately 0 to 1 convertible to Z distances in inches by multiplying the Z values by a height of the airfoil in inches, and wherein X and Y are distances in inches which, when connected by substantially smooth continuing arcs, define airfoil profile sections at each distance Z, the profile sections at the Z distances being joined substantially smoothly with one another to form a complete airfoil shape.

14. The turbine bucket according to claim 13, wherein the turbine bucket is configured to function as a second stage turbine bucket in a turbine.

15. The turbine bucket according to claim 14, wherein the turbine is a gas turbine.

16. The turbine bucket according to claim 13, wherein the shape of the airfoil lies in an envelope within approximately +/0.04 inches in a direction normal to any surface location of the airfoil.

17. The turbine bucket according to claim 13, wherein the height of the turbine bucket is approximately 17 to 19 inches.

18. The turbine bucket according to claim 13, wherein the height of the airfoil is approximately 10 to 11 inches.

* * * * *

UNITED STATES PATENT AND TRADEMARK OFFICE
CERTIFICATE OF CORRECTION

PATENT NO. : 8,371,818 B2  
APPLICATION NO. : 12/109418  
DATED : February 12, 2013  
INVENTOR(S) : Brittingham et al.

Page 1 of 1

It is certified that error appears in the above-identified patent and that said Letters Patent is hereby corrected as shown below:

On the Title Page, in Item (74), under "Attorney, Agent, or Firm", in Column 2, Lines 1-2, delete "Ernst G. Cusick;" and insert -- Ernest G. Cusick; --, therefor.

In the Claims

In Column 18, Line 20, in Claim 16, delete "+/0.04" and insert -- +/-0.04 --, therefor.

Signed and Sealed this  
Twenty-third Day of April, 2013

Teresa Stanek Rea  
*Acting Director of the United States Patent and Trademark Office*